(12) United States Patent
Shih

(10) Patent No.: US 6,967,837 B2
(45) Date of Patent: Nov. 22, 2005

(54) COMPUTER APPARATUS ASSEMBLED WIRELESSLY

(75) Inventor: Shoei-Yuan Shih, Shijr (TW)

(73) Assignee: Evserv Tech Corporation, Taipei Hsien (TW)

( * ) Notice: Subject to any disclaimer, the term of this patent is extended or adjusted under 35 U.S.C. 154(b) by 130 days.

(21) Appl. No.: 10/462,750

(22) Filed: Jun. 17, 2003

(65) Prior Publication Data

US 2004/0257762 A1 Dec. 23, 2004

(51) Int. Cl.$^7$ .................................................. G06F 1/20
(52) U.S. Cl. ..................................... 361/687; 361/683
(58) Field of Search ......................... 361/679, 683–689

(56) References Cited

U.S. PATENT DOCUMENTS

| | | | | |
|---|---|---|---|---|
| 5,218,514 A | * | 6/1993 | Huynh et al. | 361/683 |
| 6,510,050 B1 | * | 1/2003 | Lee et al. | 361/685 |
| 6,525,926 B1 | * | 2/2003 | Chen | 361/683 |
| 2002/0194412 A1 | * | 12/2002 | Bottom | |

* cited by examiner

*Primary Examiner*—Yean-Hsi Chang
(74) *Attorney, Agent, or Firm*—Birch, Stewart, Kolasch & Birch, LLP

(57) ABSTRACT

A computer apparatus assembled wirelessly includes electronic base members assembled in the computer apparatus that are coupled with one another to establish electric connection through connectors and connection ports to replace connection cables thereby to shrink the size of the entire computer apparatus and improve the convenience of repairs and replacement.

8 Claims, 5 Drawing Sheets

COMPUTER APPARATUS ASSEMBLED WIRELESSLY

FIELD OF THE INVENTION

The present invention relates to a computer apparatus assembled wirelessly and particularly to a computer apparatus that establishes electric connection for a plurality of electronic base members such as information storage units, power supply unit, logic processing unit, radiation unit and bus connection unit in an integrated fashion without using wires or cables.

BACKGROUND OF THE INVENTION

With increasing advances in the information industry, all types of electronic products are designed and made to meet users' requirements. For computers, many different modules also have to be integrated to meet this demand. The general home use desktop computers, notebook computers or standalone servers often encounter a problem of data storage being saturated but having no room for expansion. Hence to integrate the external storage devices has become one of the research and development focuses in the information industry these days.

Refer to FIG. 1 for a present external storage device. The integrated structure must include a plurality of electronic base members such as information storage units, power supply unit, logic processing unit, radiation unit and bus connection unit. Compared with a general single storage device (such as hard disk retrieval rack), the main consideration for integration is to provide an external power supply to drive the external storage device and also provide a radiation unit to maintain a desired internal temperature for the storage device so its operation performance can be maintained at a desired level. However such device cannot get rid of the electric connection adopted on the general computer host. Aside from the information storage units that can employ the retrieval connection type to achieve the convenience of connection without cables, other electronic base members still have to resort power cords or bus flat cables to connect the logic and processing unit and the radiation unit, and the bus connection unit. Such type of assembly takes a lot of working time and operations. In the event of damages happened, the whole set of host casing must be disassembled, and the connection cables have to be removed for repairs and replacement. It also cannot enjoy the benefits of hot-swappable technique and function for the electronic base members. In addition, the connection cables often have extra length, and the host casing must reserve an additional space to accommodate the extra connection cables. As a result, the total size of the device is too big and is not convenient to install or carry. It also does not meet the prevailing trend that demands compact size. Moreover, the extra connection cables hinder the radiation unit to draw and disperse heat from the interior of the device. This directly affects the operation performance of the external storage device.

SUMMARY OF THE INVENTION

The primary object of the invention is to resolve the aforesaid disadvantages and to overcome the drawbacks of the prior art. The invention mainly employs connectors and connection ports to assemble the electronic base members in the computer apparatus and establish electric connection to replace the conventional connection cables. The size of the whole computer apparatus may be shrunk and repairs and replacement are more convenient. According to the invention, the host casing is divided into a plurality of housing compartments for holding and assembling the electronic base members. Each electronic base member has connectors mating connection ports located on corresponding locations of another electronic base member so that they can be coupled with one another to establish electric connection. Thus when to assemble all the electronic base members in the host casing, there is no need to use extra connection cables to couple with one another to establish electric connection.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
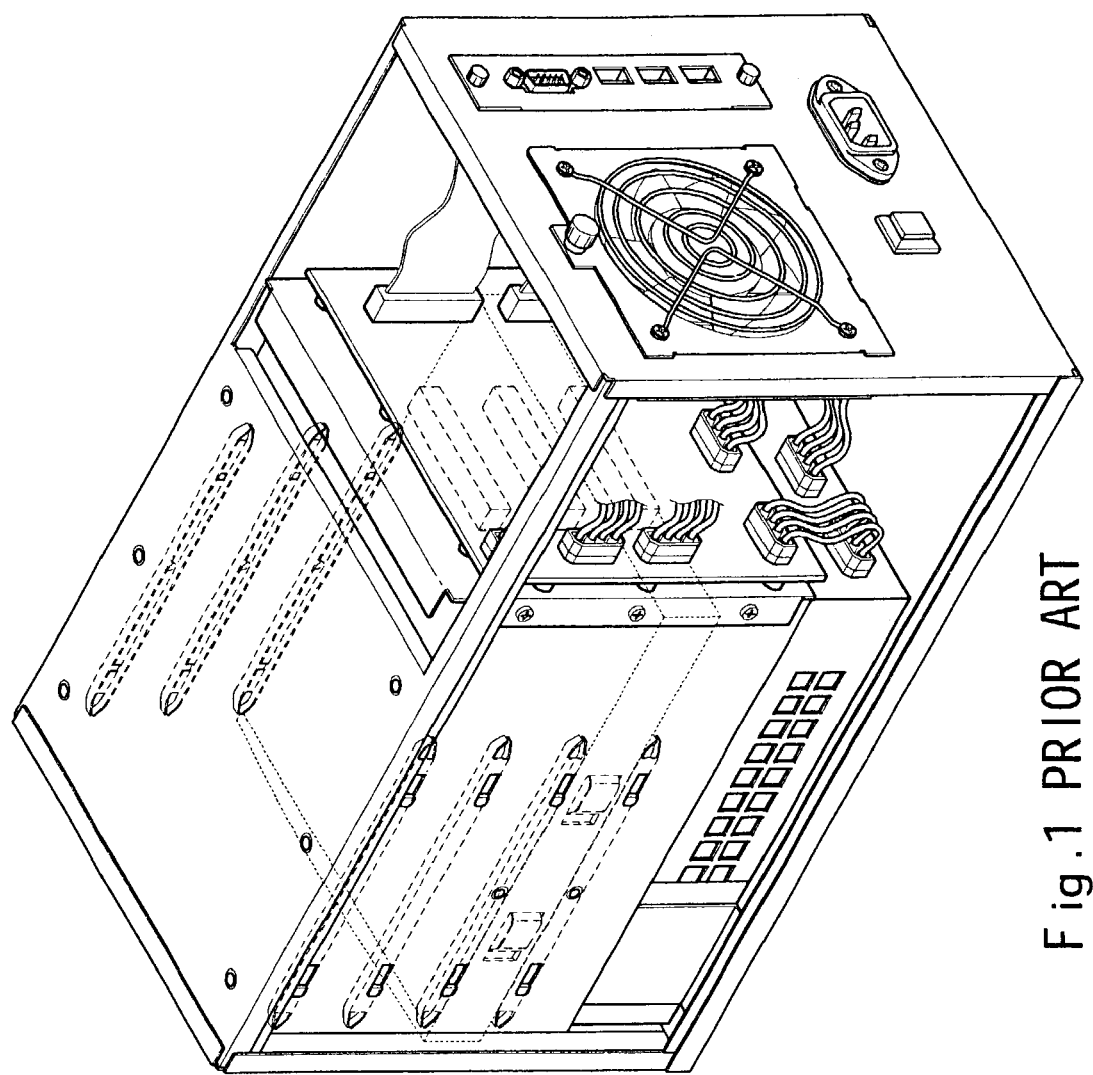
FIG. 1 is a perspective view of a conventional external connecting storage device.
Figure 2:
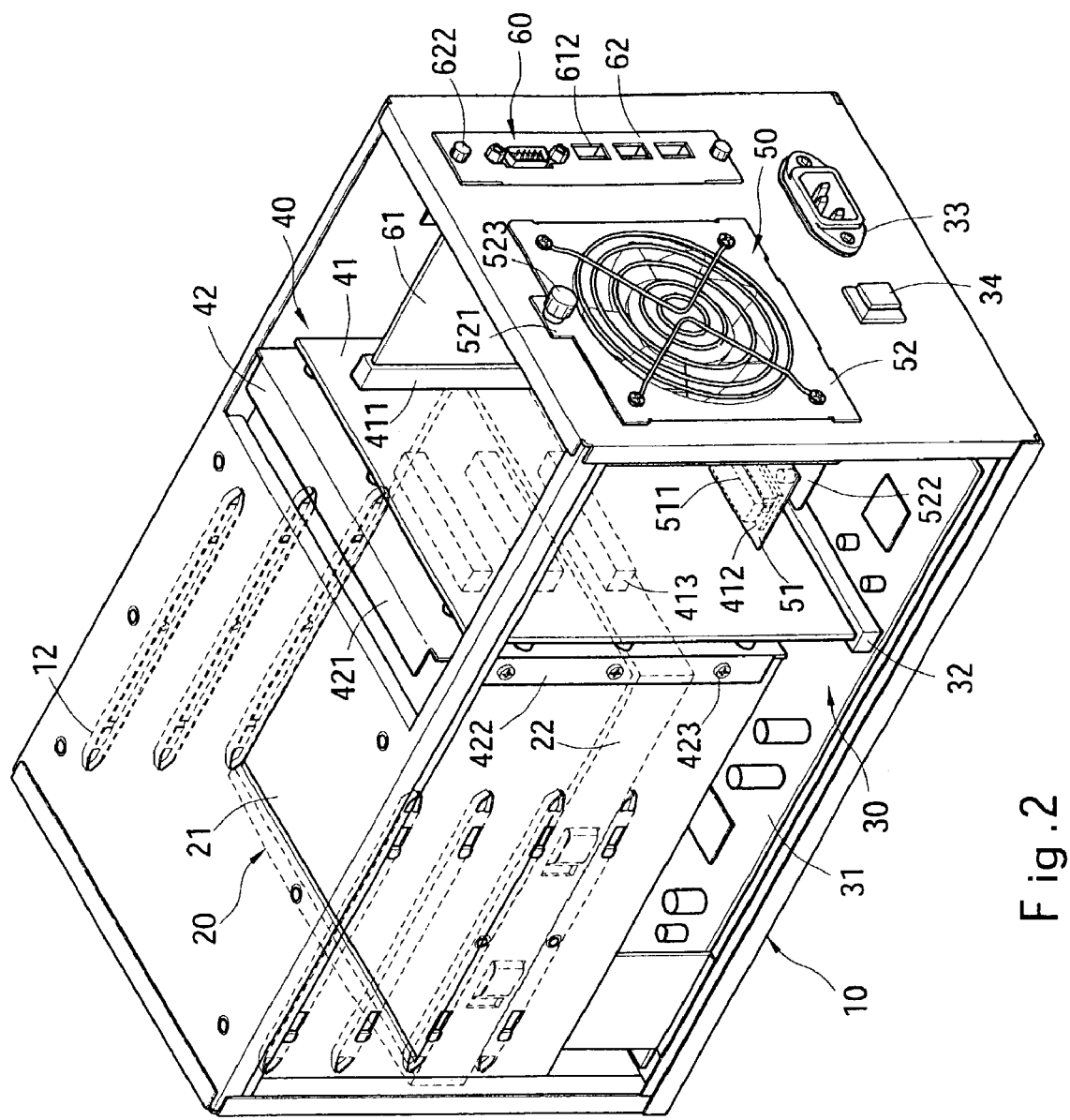
FIG. 2 is a perspective view of the present invention.
Figure 3:
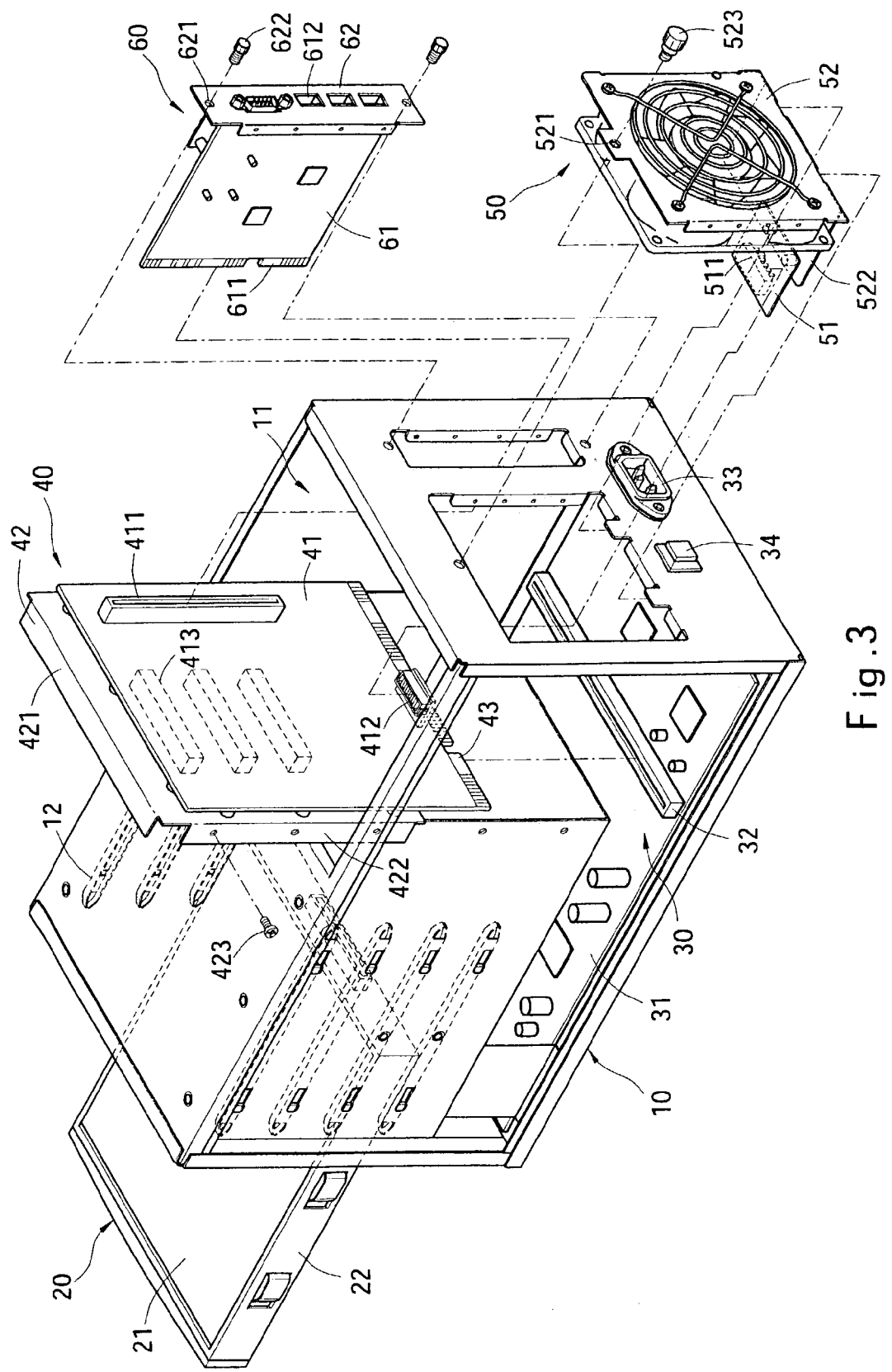
FIG. 3 is an exploded view of the present invention.

Please referring to FIGS. 2 and 3, the computer apparatus assembled wirelessly according to the invention includes a host casing 10 which has the interior dividing into a plurality of housing compartments 11 for housing a plurality of electronic base members. Each electronic base member has a connector 43, 511, or 611 corresponding to and mating a connection port 32, 411, 412 or 413 located on another electronic base member so that they can be coupled with each other to establish electric connection. Thus when to assemble the electronic base members in the host casing 10, there is no need to use extra connection cables, and repairs and replacement are more convenient.

The electronic base members include information storage units 20, a power supply unit 30, a logic processing unit 40, a radiation unit 50 and a bus connection unit 60. Each electronic base member has a fastening section 422, 521 or 621 for fastening to the host casing 10.

For the information storage units 20, in the housing compartment 11 of the host casing 10 for housing the information storage units 20, a plurality of spacers 12 are provided to accommodate a plurality of information storage units 20 at the same time. Each of the information storage units 20 includes a hard disk 21 and a retrieval rack 21 for holding the hard disk 21.

The power supply unit 30 is a circuit board 31 which has electronic elements for transforming voltage and distributing power supply. The circuit board 31 further has a connection port 32 to couple with the logic processing unit 40 to establish electric connection. The circuit board 31 has a rear side which has a power supply insert slot 33 and a switch 34 exposed outside the host casing 10.

The logic processing unit 40 includes a frame 42 and a main board 41 mounting on the frame 42. The frame 42 has an upper end bent and extended to form a flange 421 and a side end bent to form a fastening section 422 for fastening to the host casing 10. The main board 41 has connection ports 411, 412 and 413 for coupling with the information storage units 20, radiation unit 50 and bus connection unit 60 to establish electric connections. The main board 41 further has a connector 43 located on a lower end to couple with the power supply unit 30 to establish electric connection.

The radiation unit 50 has an air fan bracket 52 fastening to the host casing 10. The air fan bracket 52 has an air fan mounted thereon and is extended to form a mounting section 522. The mounting section 522 has a circuit board 51 located thereon. The circuit board 51 has a connector 511 to couple with the logic processing unit 40 to establish electric connection.

The bus connection unit 60 has a mounting bracket 62 for fastening to the host casing 10. The mounting rack 62 has one or more bus 612 and a circuit board 61 with a connector 611 located thereon to couple with the logic processing unit 40 to establish electric connection.

Figure 4:
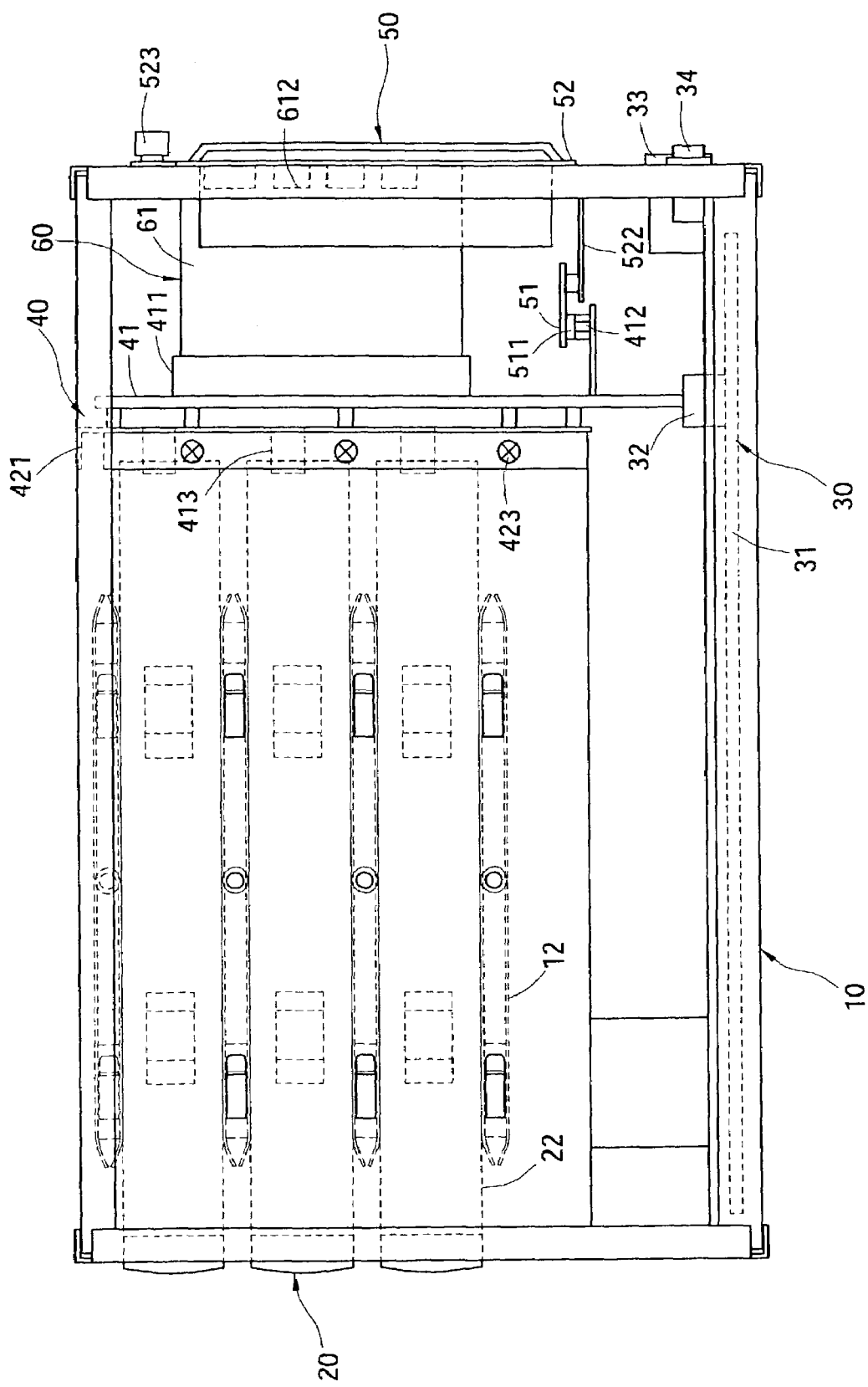
FIG. 4 is a top view of the present invention.
Figure 5:
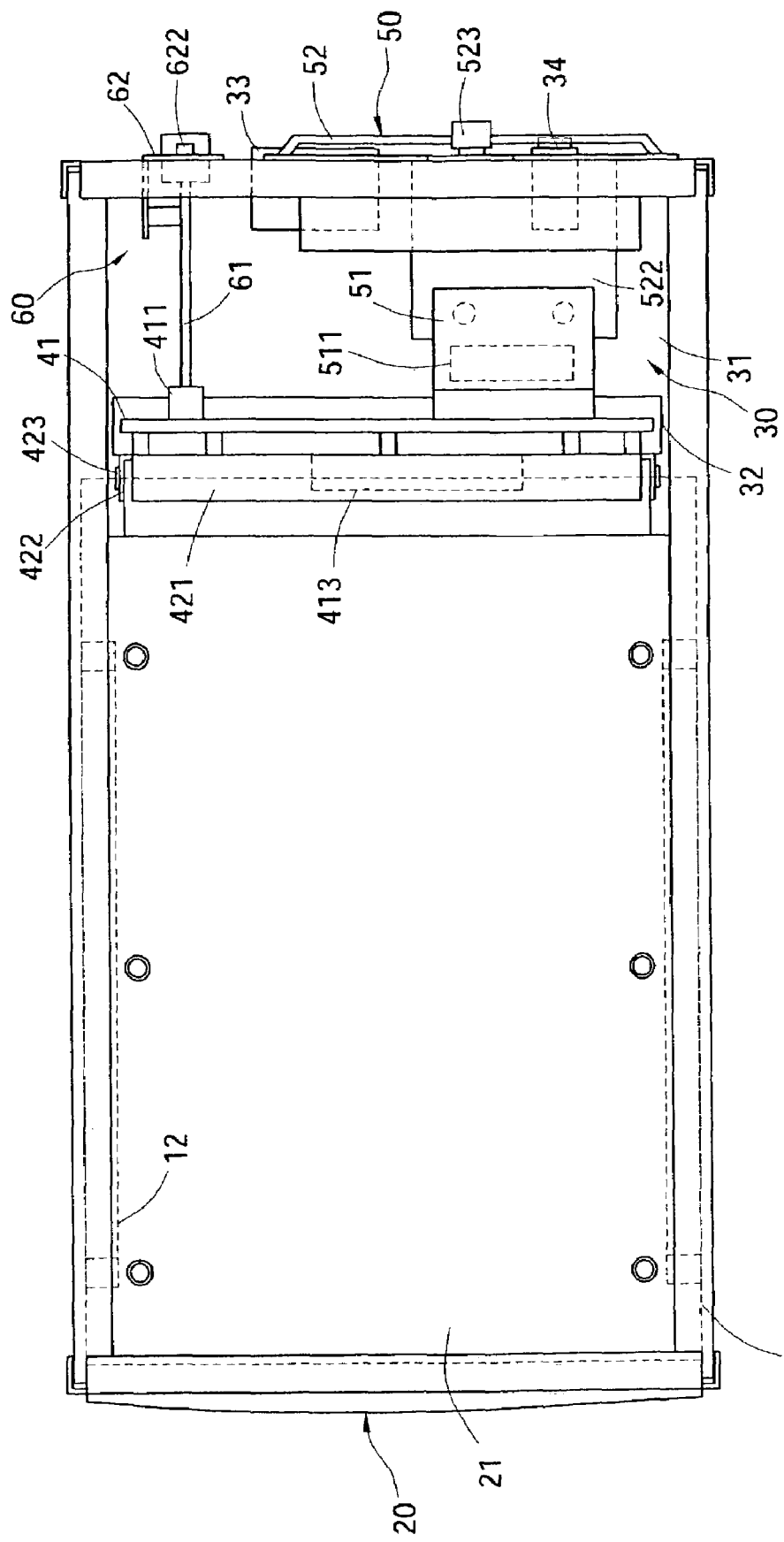
FIG. 5 is a side view of the present invention.

Refer to FIGS. 4 and 5 for assembling the electronic base members of the invention. As each electronic base member has a gold finger-like connector 43, 511 or 611 mating and coupling with a connection port 32, 411, or 412 of another electronic base member to establish electric connection, the order of assembly generally starts from the power supply unit 30 by disposing the circuit board 31 in one housing compartment 11 located at the bottom layer; then the connector 43 of the main board 41 of the logic processing unit 40 is coupled with the connection port 32 of the circuit board 31 of the power supply unit 30, and the fastening section 422 of the main board 41 is fastened to the host casing 10 through fasteners 423; next, the connectors 511 and 611 on the circuit boards 51 and 61 of the radiation unit 50 and the bus connection unit 60 are coupled with the connection ports 411 and 412 of the main board 41 to establish electric connection, and the fastening sections 521 and 621 located thereon are fastened respectively to the host casing 10 through fasteners 523 and 622. Finally, the information storage units 20 are placed between the spacers 12 to complete assembly of the computer apparatus.

As the aforesaid electronic base members do not need connection cables to establish electric connection during assembly, assembly or repairs and replacement in the future can be done with reduced time and process. There is also no need to allocate space to accommodate extra connection cables. Thus the size of the computer apparatus may be effectively shrunk. Furthermore, without the hindrance of extra connection cables, thermal energy generated by the electronic base members can be discharged easily through the radiation unit 50 to maintain normal operation.

What is claimed is:

1. A computer apparatus assembled wirelessly, comprising:

a host casing being divided into a plurality of housing compartments;

a plurality of electronic base members housed in the housing compartments, the electronic base members including information storage units, a power supply unit, a logic processing unit, a radiation unit and a bus connection unit, each electronic base member having connectors mating connection ports located on corresponding locations of another electronic base member for coupling with one another to establish electric connection, thereby the electronic base members are assembled in the host casing without using extra connection cables to facilitate repairs and replacement, the logic processing unit including a frame and a main board mounting on the frame, the frame having an upper end bent and extended to form a flange and a side end bent to form a fastening section for fastening to the host casing, the main board having connection ports for coupling with the information storage units, the radiation unit and the bus connection unit to establish electric connections, and a connector located on a lower end thereof to couple with the power supply unit to establish electric connection.

2. The computer apparatus of claim 1, wherein each of the electronic base members has a fastening section for fastening to the host casing.

3. The computer apparatus of claim 1, wherein the connectors are gold fingers.

4. The computer apparatus of claim 1, wherein the housing compartment for housing the information storage units has a plurality of spacers.

5. The computer apparatus of claim 1, wherein the power supply unit is a circuit board which has a connection port to couple with the logic processing unit to establish electric connection, and a rear side which has a power supply insert slot and a switch exposed outside the host casing.

6. The computer apparatus of claim 1, wherein the logic processing unit includes a frame and the main board mounting on the frame, the frame having an upper end bent and extended to form a flange and a side end bent to form a fastening section for fastening to the host casing.

7. The computer apparatus of claim 1, wherein the radiation unit has an air fan bracket fastening to the host casing, the air fan bracket having an air fan mounted thereon and being extended to form a mounting section which has a circuit board located thereon, the circuit board having a connector to couple with the logic processing unit to establish electric connection.

8. The computer apparatus of claim 1, wherein the bus connection unit has a mounting bracket for fastening to the host casing, the mounting bracket having one or more bus and a circuit board which has a connector to couple with the logic processing unit to establish electric connection.

* * * * *